United States Patent Office 2,931,717
Patented Apr. 5, 1960

2,931,717
TREATMENT OF PARTICULATE IRON ORE

John M. Lee, Lake Jackson, Tex., assignor to The Dow Chemical Company, Midland, Mich., a corporation of Delaware No Drawing. Application November 5, 1956
Serial No. 620,189

3 Claims. (Cl. 75—3)

This invention relates to treating particulate iron ore and especially relates to conglobating into pellets or to pressure-molding into briquets or otherwise agglomerating particulate iron ore concentrate and fines.

Iron ore concentrate is generally derived from lower grade iron ore or ferruginous chert, e.g., the taconites of Minnesota and Michigan which contain about 27% iron, chiefly in the form of magnetite. Fines comprise flue dust formed during blast furnace operations and fine mesh screenings consisting of highly disseminated ore formed during bulk handling of iron ores generally.

Iron ore concentrate is the beneficiated ore resulting from a separation of the major portion of the gangue from the iron compounds, e.g., $Fe_3O_4$, in ferruginous chert. The essential steps in beneficiating the ore are reduction to particulate size, wet-grinding, and recovery of the enriched iron-bearing concentrate as by flotation or magnetic means. The recovered concentrate, which is in a particulate or even pulverulent state, cannot be fed in such state to a blast furnace because, when such an attempt is made, much of it is blown back out of the furnace. It is therefore necessary that particulate iron ore, prior to its being fed to a blast furnace, be agglomerated into small lumps, masses or aggregates.

Methods of agglomeration include sintering, nodulizing, briquetting, and pelletizing. Although various modifications of these methods have been used with some degree of success, they have not been fully satisfactory. Sintering, which consists largely of fusing the concentrate into cakes or blocks and thereafter breaking them up, requires high temperatures, special heavy equipment for the subsequent breaking up of the cakes, and results in great disparity in the size of the lumps formed and the formation of considerable fine material which requires resintering. Nodulizing, which consists largely of heating the concentrate to fusion temperature while subjecting it to a rolling motion in a rotating kiln, also requires high temperatures and the intended spheroids thus formed are sometimes rings or otherwise partially hollow or not sufficiently compacted in the interior and are therefore lacking in strength. Briquetting, which consists of forcing given volumes of wet concentrate containing a binding agent into molds under considerable pressure, removing the thus-formed briquets therefrom, and indurating them by heat, has not been fully satisfactory because the binding agents known to the art have not imparted sufficient binding strength unless the green briquets are subjected to near-fusion temperatures. Pelletizing, which consists of admixing a binding agent with wet ore and subjecting the thus-treated ore to a rolling motion in a rotating cylinder thereby forming "balls" or green pellets which are thereafter indurated by heat, is also not fully satisfactory because, as in the case of forming pellets, known binding agents have not imparted sufficient binding strength unless the subsequent induration is carried on at near-fusion temperature.

Agglomerates, such as bodies in the form of briquets or pellets, are not acceptable in the art unless they are of sufficient strength to substantially withstand shipping and handling, the impact of being dropped into the blast furnace, and the weight of additional agglomerates being superimposed upon them in the furnace.

There is, therefore, a desideratum in the art for a more effective and economical process for agglomerating iron ore concentrate and fines.

According to my invention, I provide a method of agglomerating particulate iron ore concentrate and fines by incorporating into such particulate concentrate and fines between 0.2 and 2.0 percent by weight of an alkali hydroxide, e.g., sodium hydroxide or ammonium hydroxide, or an alkali carbonate, with or without up to 5 percent calcium hydroxide in the presence of between 2.5 and 12.5 percent of water, forming into agglomerates as by conglobating the thus-treated ore into pellets or pressure-molding it into briquets, and thereafter indurating the thus-formed green pellets or briquets by subjecting them to a temperature of at least 250° C. but below the fusion temperature. Generally a safe upper temperature is below 1100° C.

The term alkali as used herein is limited to ammonium or an alkali metal hydroxide or alkali metal or ammonium carbonate. In practicing the invention, I prefer to employ sodium hydroxide in an amount between 0.8 and 1.0 percent by weight in the form of a 0.25 to 0.90 weight percent aqueous solution thereof in the presence of a total water content of between 5 and 7.5 weight percent when making briquets and between 8 and 12.5 percent when making pellets, based on the weight of the iron ore concentrate or fines. One embodiment of the invention employs calcium hydroxide with the alkali in an amount up to 6 percent by weight of the ore being treated but usually in an amount which is about 3 to 5 times the weight of the alkali used.

A further embodiment of the invention employs magnesium hydroxide with the alkali or with the alkali and $Ca(OH)_2$ in an amount up to about 1 percent of the weight of the ore concentrate or fines. $Mg(OH)_2$ is often already present in the concentrate or fines, e.g., 0.5 and 0.6 percent in fines and ore which were examined. It is therefore preferred, that magnesium oxide or magnesium hydroxide, if not present in the ore, be added in an amount up to about 1 percent of the weight of the concentrate being treated.

As a further embodiment of the invention, an alkali hydroxide or a salt thereof may be added in a relatively large proportionate amount to a particulate ore, e.g., taconite ore concentrate, to produce a mixture having a high alkali content, viz., one having a weight ratio of 1 NaOH to between 1 and 4 of particulate ore, fusing the thus-formed mixture, cooling it to a brittle mass, breaking the thus-formed mass, and admixing therewith water and additional ore to form a cohesive mass having an alkali hydroxide content based on the thus-treated ore of between 0.2 and 2.0 percent. $Ca(OH)_2$ may be present up to 5 times the weight of the NaOH and $Mg(OH)_2$ may be present up to 1 percent of the weight of the thus-treated ore as in the afore-described embodiments.

The thus-treated ore is thereafter agglomerated and heat indurated as explained in the following paragraphs.

In practicing the invention, unless the embodiment employing fusion is followed, as set out broadly in the penultimate paragraph above, the alkali preferably as an aqueous solution thereof, and the calcium hydroxide and magnesium hydroxide, if any, either as an aqueous solution or slurry thereof or as unslaked calcium oxide and/or magnesium oxide, are mixed with the concentrates or fines in the proper proportion in a convenient manner, as by mechanically mixing, tumbling, or hand-paddling. A particularly convenient way is to feed the alkali, and calcium hydroxide and magnesium hydroxide, if employed, to the ore by means of a conveyor, duct, or the like while the ore is being agitated or simultaneously being fed into a common hopper or mixer, as by a separate conveyor.

When the embodiment employing the fusion step of an alkali-ore mixture containing a high alkali concentration prior to completing preparation of the mixture by the incorporation of a large amount of additional ore is followed, appropriate steps in the pursuance thereof are observed. Those steps are made clear in Example 21 of the specification.

After admixing the alkali, and calcium hydroxide and magnesium oxide if employed, and water if the latter is required in addition to that retained from the beneficiation process plus that supplied by the aqueous alkali solution, the thus-treated ore is agglomerated into small masses by any known method as by conglobating into pellets, molding into briquets, or by fusing into blocks which are subsequently broken into fragments. Pellets are appropriately formed by rolling the treated ore in a rotating cylinder, preferably having its axis slightly inclined from the horizontal, wherein the particles grow by accretion to the desired size. As an alternate method of agglomeration, particularly suited to the practice of the invention, the thus-treated ore is forced into molds by a pressure of between about 2500 and 25,000 p.s.i. to make briquets. Any known means of making briquets may be employed. A convenient molding apparatus may be used for forming briquets which consists essentially of a pair of mated rollers forming a bite therebetween, the rollers having pockets or cavities formed in the surface and being made to rotate in opposite directions, i.e., inwardly toward the bite. The treated wet particulate ore is fed into the bite as by a conveyor means, and thereafter removed from the pockets or cavities from the discharge side of the bite. The size of the pellets or briquets is not critical. It is preferred that they have a minimum dimension of at least 0.3 inch. The maximum dimension is not critical but is usually not over 2.5 inches.

The green agglomerates thus-formed are indurated by heat for from 0.5 to 2 hours at a temperature generally between 250° and a temperature below the fusion temperature of the iron ore. A preferable procedure is to place the agglomerates, whether pellets or briquets, in a furnace, e.g., a muffle furnace, at a temperature between 150° and 200° C., e.g., 170° C., for at least 0.5 hour for an initial gradual increase in temperature to discourage spalling, and then heating them at between 400, and 650° C., e.g., 450° C. for an additional 0.5 hour. Longer heating is not detrimental, but usually is unnecessary. The ore agglomerates so prepared strongly resist attrition and breakage and are suitable for charging into a blast furnace without excessive loss by dusting or breakage.

The practice of the invention is made manifest by the following examples. Fines, which are largely dust formed incidental to blast furnace operations, were used in the Examples 1 to 20 and taconite iron ore concentrate made by beneficiating magnetic Minnesota taconite was used for Example 21. The fines were chosen as an ore to illustrate the invention because they are composed largely of hematite and are therefore particularly difficult to bind into agglomerates, unless the hematite is formed in situ in the agglomerates. The fines employed in the examples contained the following oxides by analysis:

IRON ORE FINES

| Component: | Percent by weight |
|---|---|
| $Fe_2O_3$ | 81.7 |
| $Fe_3O_4$ | 2.6 |
| $SiO_2$ | 5.2 |
| $Al_2O_3$ | 1.5 |
| CaO | 3.9 |
| MgO | 0.5 |
| $TiO_2$ | 0.2 |
| MnO | 0.1 |
| $P_2O_5$ | 2.4 |
| $CO_2$ | 0.5 |

In Examples 1 to 20 of the invention (Series 1 to 3) the ore fines showing the above analysis after treatment as set out hereinafter in the examples, were made into briquets of approximately two square inches in cross-section and about 1 inch long. After formation at the pressures set out in the examples, all briquets were indurated in two stages: the first comprised heating for a period of 0.5 hour at 170° C. and the second for a period of 0.5 hour at 450° C. The resistance to breakage of briquets made according to Examples 1–20, was measured by a drop test consisting of dropping the indurated briquets a distance of 14 feet two successive times through a 4-inch diameter pipe onto a 5/8 inch thick stainless steel plate. The briquets made according to Example 21 were tested by dropping them three times through a distance of 33 feet onto a concrete floor. The results of the breakage tests were determined by collecting the fallen material and screening it to ascertain the percent by weight which did not pass through a No. 3 standard screen (United States Bureau of Mines Series).

SERIES ONE

Examples 1 to 4

Examples 1 to 4 were prepared by taking 500-gram samples of the ore fines described above and admixing therewith water and NaOH as shown in Table I below. One sample was run as a control and is designated as a blank in Table I; to it no NaOH was added. The NaOH was added to Examples 1 to 4 in a 50 percent aqueous solution. Sufficient additional water was added to all examples to give a total water content of 5 percent by weight. The thus-treated ore in each example was made into a substantially homogeneous mixture by mixing it by a conventional rotating barrel mixer of the type generally used for mixing concrete. Briquets were formed as described above at a pressure of 15,000 p.s.i. and indurated by heat as described. The briquets thus made were tested by the drop test as described above. The results of the tests on briquets as determined by the percentage not passing through a U.S. No. 3 standard screen are set out in Table I. The higher the numerical value in the table, the more resistant to breakage are the briquets.

TABLE I

| Example | Percent Water | Percent NaOH | Percent not passing through No. 3 Screen |
|---|---|---|---|
| Blank | 5 | None | 2 |
| 1 | 5 | 0.5 | 40 |
| 2 | 5 | 1.0 | 57 |
| 3 | 5 | 2.0 | 62 |
| 4 | 5 | 5.0 | 70 |

SERIES TWO

Examples 5 to 12

Series Two, Examples 5 to 12 and blanks A, B, C, and D for controls, were prepared from twelve additional 500-gram samples of the ore fines. The procedure followed in mixing the ore with water and the treating ingredients were substantially the same as in Series One. The twelve samples were divided into four groups consisting of a blank and two consecutively numbered examples in each group as shown in the Table II. $Ca(OH)_2$ and water were added to each of the three samples of each group in unchanged amounts but were varied from group to group. NaOH was not added to the blanks. NaOH was added to each of the two examples of each group in amounts of 0.45 and 0.90 weight percent, respectively. The percentages of the water and treating ingredients are shown in Table II below.

Briquets were formed in Series Two by the procedure followed in Series One, except a pressure of 7500 p.s.i. was used. The resistance to breakage was determined by the drop test as in Series One. The results of the test for Series Two are shown in Table II.

TABLE II

| Examples | Percent $H_2O$ | Percent NaOH | Percent $Ca(OH)_2$ | Percent not passing through No. 3 Screen |
|---|---|---|---|---|
| Blank A | 5 | None | 5 | 48 |
| 5 | 5 | 0.45 | 5 | 88 |
| 6 | 5 | 0.90 | 5 | 100 |
| Blank B | 10 | None | 5 | 30 |
| 7 | 10 | 0.45 | 5 | 78 |
| 8 | 10 | 0.90 | 5 | 98 |
| Blank C | 5 | None | 2.5 | 52 |
| 9 | 5 | 0.45 | 2.5 | 84 |
| 10 | 5 | 0.90 | 2.5 | 88 |
| Blank D | 10 | None | 2.5 | 37 |
| 11 | 10 | 0.45 | 2.5 | 67 |
| 12 | 10 | 0.90 | 2.5 | 83 |

SERIES THREE

*Examples 13 to 20*

Examples 13 to 20 together with blanks E to H were made up by taking twelve additional 500-gram samples of the ore fines and mixing and forming them into briquets according to the same general procedure as was followed for Series One and Two. The twelve samples were divided into four groups, in a similar manner to the grouping plan followed in Series Two, i.e., a blank and two examples in each group. Water and $Ca(OH)_2$ were added in the same amount to the blank and each of the examples of each group, but the amounts of water and $Ca(OH)_2$ were varied in the different groups. NaOH was not added to blanks E to H, but was added to the two examples of each group as shown in Table III. Each blank and example thus prepared was molded into briquets according to the procedure used in Series One and Two except the pressure used was only 2,500 p.s.i. The thus-formed briquets were tested by the drop test as in Series One and Two. The percentage composition of the examples in Series Three and the results of the test are shown in Table III.

TABLE III

| Examples | Percent $H_2O$ | Percent $Ca(OH)_2$ | Percent NaOH | Percent not passing through No. 3 Screen |
|---|---|---|---|---|
| Blank E | 5 | 5 | None | 34 |
| 13 | 5 | 5 | 0.45 | 89 |
| 14 | 5 | 5 | 0.90 | 98 |
| Blank F | 10 | 5 | None | 26 |
| 15 | 10 | 5 | 0.45 | 85 |
| 16 | 10 | 5 | 0.90 | 88 |
| Blank G | 5 | 2.5 | None | 6 |
| 17 | 5 | 2.5 | 0.45 | 79 |
| 18 | 5 | 2.5 | 0.90 | 75 |
| Blank H | 10 | 2.5 | None | 4 |
| 19 | 10 | 2.5 | 0.45 | 52 |
| 20 | 10 | 2.5 | 0.90 | 61 |

By an examination of the results shown in Tables I to III, the following conclusions can be drawn:

(1) Aqueous NaOH alone admixed with ore fines produces good briquets, but the amount of NaOH required is relatively large when compared to admixtures containing $Ca(OH)_2$.

(2) Additions of $Ca(OH)_2$ to the mixture of iron ore and aqueous NaOH produces superior briquets at greatly reduced amounts of NaOH when compared to briquets made in the absence of $Ca(OH)_2$.

(3) Both 5 percent and 10 percent of water in the ore-$Ca(OH)_2$-NaOH mixture yield very good briquets but the higher percentage of water requires a higher percentage of NaOH and increases operating costs, by requiring additional drying time and by other operating steps, without apparent improvement.

(4) Using higher pressures in making briquets, at least up to 7500 p.s.i., results in stronger briquets in general.

*Example 21*

This example illustrates the embodiment of the invention employing the fusion step. It further illustrates the applicability of the invention to particulate iron ore other than fines since taconite concentrate was used in this example. The procedure was as follows: 2.74 g. of a 73 weight percent of aqueous NaOH solution (containing about 2 grams of NaOH) and 4.0 g. of taconite ore were fused in a nickel crucible for about 5 minutes. The mixture was stirred continuously during fusion. The fusion mixture was cooled, forming a brittle mass. The mass was broken into fragments and had admixed therewith 70 ml. of water and 996 g. more of taconite ore which produced a mixture containing about 0.2 percent of NaOH and 7.0 percent of water.

The thus-formed mixture was formed into four briquets by pressing about 23 g. portions thereof into a pillow-shaped mold. The pressure used was 14,000 p.s.i. The minimum dimension of the briquets was 0.3 inch. The green briquets thus-formed were placed in an electric muffle furnace and brought gradually up to 1100° C. over a heating period of 2 hours. They were held at 1100° C. for 5 minutes and then removed and placed in a similar furnace at 800° C. They were permitted to remain at 800° C. for 10 minutes and then were removed and placed in another muffle furnace at 400° C. for another 10 minutes. They were then removed therefrom and cooled.

The temperatures used in this example are selected because they correspond to present temperatures used in the making of agglomerates in the art by other methods and are not to be construed as limiting the temperature which may be employed in this embodiment. The broader temperature ranges set out in the fore part of the specification and in the appended claims adequately limit the temperatures to be used.

The briquets made in this example were tested for brittleness or friability by dropping them three successive times through a 4-inch diameter pipe, 33 feet long, onto a concrete floor. The fallen material was then screened through a standard No. 10 mesh screen. The results of the tests are stated in percent of the fallen briquets which were retained on the screen and therefore the higher the percent the less friable and more resistant to breakage are the briquets.

The percentage by weight of four briquets tested which were retained on the No. 10 mesh screen were 96.82 percent, 97.09 percent, 95.51 percent, and 99.4 percent. The high percentage of ore which was unbroken or in fragments too large to pass through the screen compares favorably with accepted current standards of friability for blast furnace feed. In Mining Engineering (Aug. 1, 1953), at pages 803-811, there are set out results on resistance to breakage in a similar test on pellets which are acceptable to blast furnace use and which were made by known methods but at higher temperatures than in Example 21 above. The pellets discussed in the reference yielded as low as 91.4 percent by weight of particles as determined by retention on a No. 10 mesh screen. In the light of such comparison, briquets made according to the embodiment of Example 21 are clearly satisfactory in resistance to breakage.

By referring to the above examples, it may be readily observed that the practice of the invention results in a novel cohesive mixture containing iron in commercial quantities, for example, at least 25 percent iron. The invention is applicable to agglomerating iron ore, whether into pellets, briquets, or molded blocks that are later fragmented. The ore may consist of flue dust, flaked scale from the interior of blast furnaces, fines accumulated in shipholds, railroad cars, storage bins, or about mining premises, or it may be concentrate derived from low-grade iron ore. The novel cohesive mixture may be easily agglomerated into small masses and indurated, the thus-indurated masses being sufficiently resistant to fracture and breakage to meet adequately the severe requirements for blast furnace feed. The invention provides a method of agglomerating iron ore concentrates and fines, including those containing a high percentage of hematite which possess particularly poor inherent cohesive properties (unless formed in situ) by incorporating therewith low-cost and readily available materials as binding agents by a process which is relatively economical.

Having described the invention, what is claimed and desired to be protected by Letters Patent is:

1. The method of preparing blast furnace feed which comprises the steps of: admixing an aqueous solution of an alkali metal hydroxide with particulate iron ore containing at least 25 percent iron ore and 0.5 percent $Mg(OH)_2$ to give a ratio of 1 alkali metal hydroxide to between 1 and 4 of the iron ore by weight, fusing the thus-formed mixture to a brittle mass, cooling the brittle mass, fragmenting the thus-cooled mass, admixing therewith water and additional iron ore to form a cohesive mass having an alkali metal hydroxide content based on the ore of between 0.2 and 2.0 percent, forming the mass into agglomerates, and indurating the agglomerates at a temperature between 250° C. and the fusion temperature for between 0.25 and 4 hours.

2. Heat-indurated agglomerates having a minimum dimension of 0.3 inch and highly resistant to breakage by dropping for use as blast furnace feed formed by mechanically shaping bodies of a composition consisting by weight of between 0.25 and 2.0 percent of NaOH, between 2.5 and 5 percent $Ca(OH)_2$, between 0.5 and 1 percent $Mg(OH)_2$, between 2.5 and 12.5 percent water, and the balance essentially iron ore, said ore containing at least 25 percent iron.

3. The method of preparing blast furnace feed which comprises: treating iron ore fines and concentrates by admixing therewith by weight between 0.25 percent and 1.5 percent of sodium hydroxide, between 0.5 and 1.0 percent of magnesium hydroxide, and between 2.5 and 5.0 percent of calcium hydroxide in the presence of between 2.5 and 12.5 percent water; forming the thus-treated fines and concentrates into agglomerates having a minimum dimension of 0.3 inch; and indurating the thus formed agglomerates by subjecting them to heat at a temperature of at least 250° C. but below the fusion temperature for from 0.25 to 4.0 hours.

References Cited in the file of this patent

UNITED STATES PATENTS

| | | |
|---|---|---|
| 464,815 | Conkling | Dec. 8, 1891 |
| 711,059 | Long | Oct. 14, 1902 |
| 1,238,022 | Kippe | Aug. 21, 1917 |
| 1,356,100 | Tyrrell | Oct. 19, 1920 |
| 2,134,103 | Collord | Oct. 25, 1938 |
| 2,363,371 | Vignos | Nov. 21, 1944 |
| 2,394,793 | Maier | Feb. 12, 1946 |
| 2,582,386 | Komarek et al. | Jan. 15, 1952 |

FOREIGN PATENTS

| | | |
|---|---|---|
| 727,315 | Great Britain | Mar. 30, 1955 |